United States Patent
Yan

(10) Patent No.: US 8,286,664 B2
(45) Date of Patent: Oct. 16, 2012

(54) CONTROL VALVE WITH A TWO-PIECE SHIFTING MECHANISM

(75) Inventor: Yihai Yan, Shanghai (CN)

(73) Assignee: Norgren, Inc., Littleton, CO (US)

( * ) Notice: Subject to any disclaimer, the term of this patent is extended or adjusted under 35 U.S.C. 154(b) by 518 days.

(21) Appl. No.: 12/529,104

(22) PCT Filed: Mar. 5, 2007

(86) PCT No.: PCT/CN2007/000684
§ 371 (c)(1), (2), (4) Date: Aug. 28, 2009

(87) PCT Pub. No.: WO2008/106819
PCT Pub. Date: Sep. 12, 2008

(65) Prior Publication Data
US 2010/0116344 A1   May 13, 2010

(51) Int. Cl.
*F16K 11/074* (2006.01)
(52) U.S. Cl. ............ 137/625.44; 251/232; 74/524
(58) Field of Classification Search ............ 137/625.44, 137/625.45, 625.46; 251/232, 233; 74/96, 74/523–525
See application file for complete search history.

(56) References Cited

U.S. PATENT DOCUMENTS

| | | | | |
|---|---|---|---|---|
| 1,600,793 A | * | 9/1926 | Bogan | 137/625.45 |
| 2,075,959 A | * | 4/1937 | Previti | 251/75 |
| 2,610,649 A | * | 9/1952 | Brodhun | 251/75 |
| 3,373,831 A | * | 3/1968 | Terry et al. | 180/24.09 |
| 3,924,832 A | * | 12/1975 | Babcock | 251/301 |
| 4,065,982 A | * | 1/1978 | Wenger | 74/473.11 |
| 4,243,072 A | | 1/1981 | Hoffman et al. | |
| 4,450,807 A | * | 5/1984 | Kinoshita et al. | 123/403 |
| 4,648,427 A | * | 3/1987 | Fruechte et al. | 137/826 |
| 5,097,868 A | | 3/1992 | Betush | |
| 5,210,886 A | * | 5/1993 | Coe, III | 4/665 |
| 5,896,601 A | | 4/1999 | Humpert et al. | |
| 2003/0045399 A1 | | 3/2003 | Lee | |

FOREIGN PATENT DOCUMENTS

| | | |
|---|---|---|
| CN | 1403728 A | 3/2003 |
| JP | 9170656 A | 6/1997 |
| WO | WO-0177556 | 10/2001 |

* cited by examiner

*Primary Examiner* — John Fox
(74) *Attorney, Agent, or Firm* — The Ollila Law Group LLC

(57) ABSTRACT

A control valve (100,200) with a two-piece shifting mechanism is provided. The special control valve has two levers, one is a sealing lever (106,206) and the other is a shifting lever (104,204). The sealing lever (106,206) has a channel (116, 216) on one of its ends to couple together different ports (SP, S, P, IS) to change the airflow direction. Each lever has its own axis. The shifting lever and the sealing lever interact through an oval opening (114) and a cylindrical boss (112), obtaining two angular range motions. When a small angular input is put on the shifting lever it will produce a large angular output at the second end of the sealing lever. It will achieve a multiple-position switching.

12 Claims, 5 Drawing Sheets

CONTROL VALVE WITH A TWO-PIECE SHIFTING MECHANISM

BACKGROUND OF THE INVENTION

1. Field of the Invention

The invention is related to the field of control valves, and in particular, to a control valve with a two-piece shifting mechanism.

2. Description of the Prior Art

Control valves are used for a variety of purposes. One example application for a control valve is for the control of the transmission of a heavy duty vehicle. Many heavy duty vehicles have multiple ranges for their transmission. Typically a driver can select between the multiple ranges using slide switches. Unfortunately, the driver must work a number of slide switches to access all the different transmission ranges.

Therefore, there is a need for a control valve that can select between the multiple positions using a single lever.

SUMMARY OF THE INVENTION

A is control valve with a two-piece shifting mechanism is disclosed for the multiple-position switching. The control valve comprises a body with a plurality of ports. A sealing lever has a channel on one end configured to couple together a subset of the plurality of ports and a shifting lever. The sealing lever rotates around a first axis with a first range of angular motion. One end of the shifting lever is coupled to the other end of the sealing lever. The shifting lever rotates about a second axis with a second range of angular motion where the first range of angular motion is greater than the second range of angular motion due to the special tow-piece shifting mechanism.

ASPECTS

One aspect of the invention includes, a valve, comprising:
a body having a plurality of ports formed in the body;
a shifting lever coupled to the body and configured to rotate about a first axis with a first range of angular motion, the shifting lever having a first end;
a sealing lever coupled to the body and configured to rotate about a second axis with a second range of angular motion where the second range of angular motion is larger than the first range of angular motion, the sealing lever having a first end and a second end where the first end of the sealing lever is coupled to the first end of the shifting lever, the sealing lever having a channel formed in the second end of the sealing lever where the channel is configured to couple together a subset of the plurality of ports (SP, S, P, IS).

Preferably, the sealing lever is configured to have a first, a second and a third operating position and where the channel couples together a different subset of the plurality of ports at each of the three operating positions.

Preferably, a detent is configured to hold the shifting lever at each of three locations that correspond to the three operating positions of the sealing lever.

Preferably, the plurality of ports comprise ports SP, S, P and IS and the subset of ports for the first operating position contain ports S, P and IS, the subset of ports for the second operating position contain ports SP, S, and P, and the subset of ports for the third operating position contain ports SP and S.

Preferably, the shifting lever moves between three locations and where a first location corresponds to the first operating position of the sealing lever, the second location corresponds to the second operating position of the sealing lever and a third location corresponds to the third operating position of the sealing lever, and where the shifting lever moves from the first location to the second location by rotating about the first axis, the shifting lever moves from the second location to the third location by translating parallel with the first axis and then by rotating about the first axis.

Preferably, an oval opening formed in the first end of the sealing lever and a cylindrical boss formed on the first end of the shifting lever where the first end of the sealing lever is coupled to the first end of the shifting lever by having the cylindrical boss located inside the oval opening.

Preferably, first axis is parallel with the second axis.

Another aspect of the invention comprises a method of using a control valve, comprising:
switching the control valve from a first operating position to a second operating position by moving a shifting lever in a first direction;
switching the control valve from the second operating position to a third operating position by moving the shifting lever in a second direction and then moving the shifting lever in the first direction.

Preferably, the method further comprises the control valve comprises ports 1, 2, 3, and 4 and the control valve couples together ports 1, 2 and 3 when the control valve is at the first operating position, the control valve couples together ports 2, 3 and 4 when the control valve is at the second operating position, and the control valve couples together ports 3 and 4 when the control valve is at the third operating position.

Preferably, the method further comprises the second direction is orthogonal with the first direction.

Preferably, the method further comprises the first direction is a rotation about an axis and the second direction is a translation along the axis.

Another aspect of the invention comprises a method of manufacturing a control valve, comprising:
forming a body with a plurality of ports;
installing a shifting lever into the body configured to rotate about a first axis with a first range of angular motion, the shifting lever having a first end;
installing a sealing lever into the body configured to rotate about a second axis with a second range of angular motion where the second range of angular motion is larger than the first range of angular motion, the sealing lever having a first end and a second end where the first end of the sealing lever is coupled to the first end of the shifting lever, the sealing lever having a channel formed in the second end of the sealing lever where the channel is configured to couple together a subset of the plurality of ports.

Preferably, the method further comprises the sealing lever is configured to have a first, a second and a third operating position and where the channel couples together a different subset of the plurality of ports at each of the three operating positions.

Preferably, the method further comprises a detent is configured to hold the shifting lever at each of three locations that correspond to the three operating positions of the sealing lever.

Preferably, the method further comprises the plurality of ports comprise ports SP, S, P and IS and the subset of ports for the first operating position contain ports S, P and IS, the subset of ports for the second operating position contain ports SP, S, and P, and the subset of ports for the third operating position contain ports SP and S.

Preferably, the method further comprises the shifting lever moves between three locations and where a first location corresponds to the first operating position of the sealing lever, a second location corresponds to the second operating position of the sealing lever, and the third location correspond to the third operating position of the sealing lever, and where the shifting lever moves from the first location to the second location by moving in a first direction, the shifting lever moves from the second location to the third location by moving in a second direction and then moving in the first direction.

Preferably, the method further comprising:

forming an oval opening in the first end of the sealing lever and forming a cylindrical boss on the first end of the shifting lever where the first end of the sealing lever is coupled to the first end of the shifting lever by having the cylindrical boss located in the oval opening.

Preferably, the method further comprises first axis is parallel with the second axis.

Another aspect of the invention comprises a control valve, comprising:

a valve body with a plurality of ports;

a sealing device configured to have a first, a second and a third operating position and where the sealing device has a first range of motion between the first, second, and third operating positions, and where the sealing device has a sealing means for coupling together a different subset of the plurality of ports at each of the first, second, and third operating positions;

a driving means for shifting the sealing device between the first, second, and third operating positions where the driving means has a smaller range of motion than the first range of motion.

DETAILED DESCRIPTION OF THE PREFERRED EMBODIMENT

Figure 1:
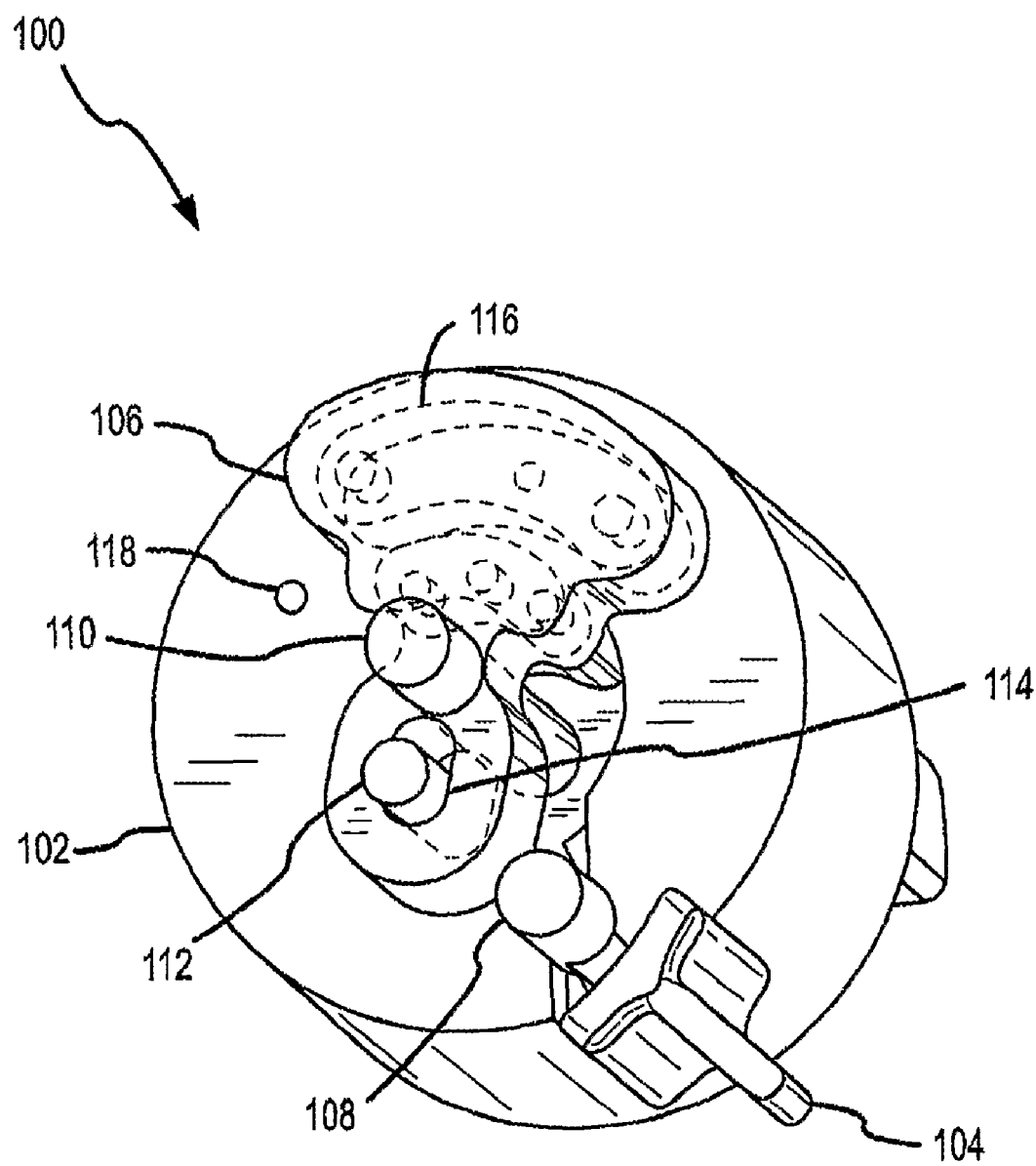
FIG. 1 is an isometric view of control valve 100 in an example embodiment of the invention.

FIGS. 1-2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 is an isometric view of control valve 100 in an example embodiment of the invention. Control valve 100 comprises body 102, shifting lever 104 and sealing lever 106. Shifting lever 104 may also be known as a thumb lever. A channel 116 is formed at a first end of sealing lever 106. Sealing lever 106 is configured to direct flow between different ports formed in body 102 when channel 116 is positioned at different locations. Shifting lever 104 is configured to move sealing lever 106 to the different locations or positions. Shifting lever 104 rotates around the cylindrical axis of cylinder 108. Sealing lever 106 rotates around the cylindrical axis of cylinder 110. An oval opening 114 is formed in the second end of sealing lever 106. Cylindrical boss 112 is formed at one end of shifting lever 104. Cylindrical boss 112 fits inside oval opening 114. In operation, as shifting lever 104 is rotated, cylindrical boss 112 interacts with the inner surface of oval opening 114, causing sealing lever 106 to rotate. The ratio between the length of the shifting lever 104 and the length of sealing lever 106 is adjusted such that the sealing lever 106 makes a larger angular displacement than the angular displacement of the shifting level 104. In one example embodiment of the invention, a 20 degree angular displacement of the shifting lever 104 results in a larger than 20 degree angular displacement of the sealing lever 106.

Figure 2A:
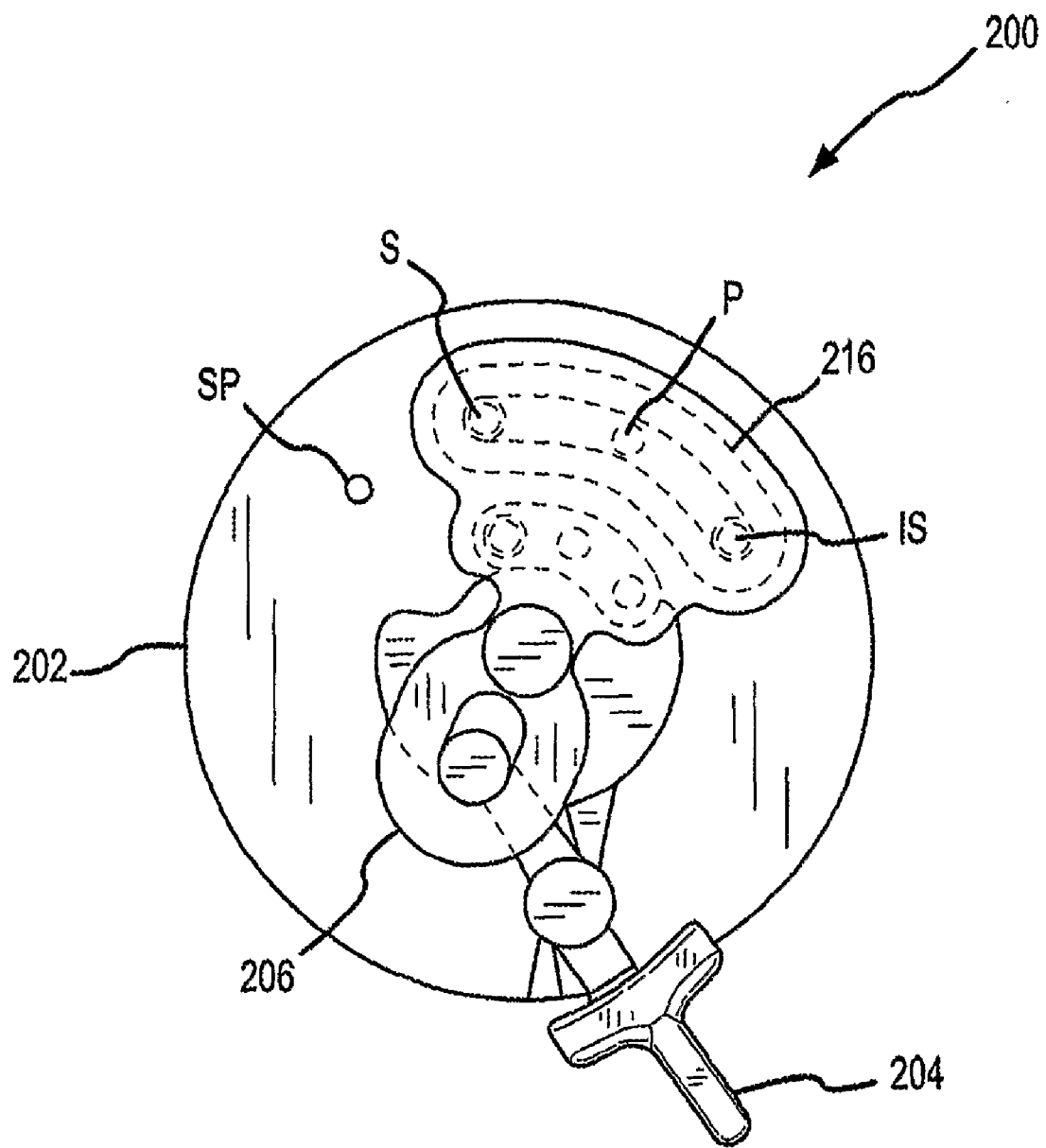
FIG. 2a is a top view of control valve 200 at a first position in an example embodiment of the invention.
Figure 2B:
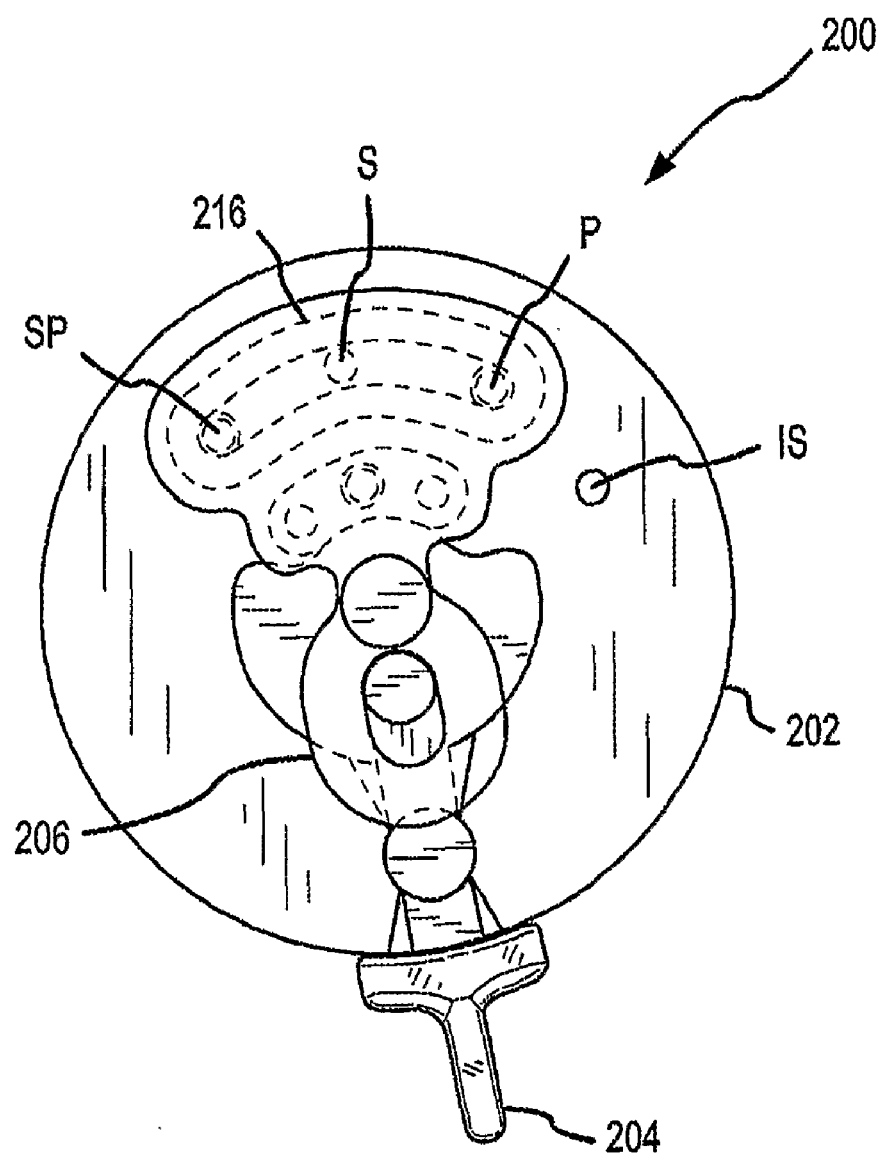
FIG. 2b is a top view of control valve 200 at a second position in an example embodiment of the invention.
Figure 2C:
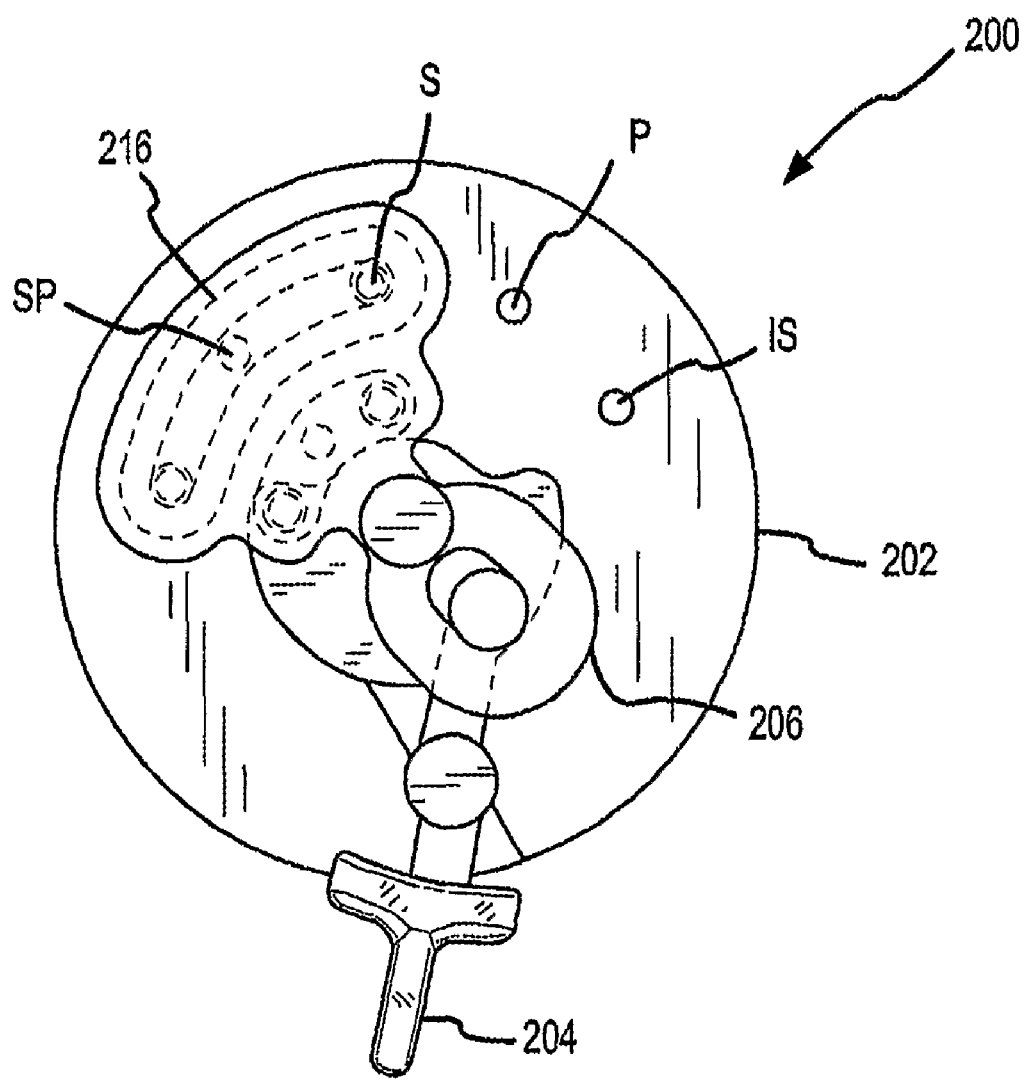
FIG. 2c is a top view of control valve 200 at a third position in an example embodiment of the invention.

In one example embodiment of the invention, the control valve is a three-way control valve configured to have three different positions. FIG. 2a is a top view of control valve 200 at a first position in an example embodiment of the invention. Control valve 200 comprises shifting lever 204, body 202 and sealing lever 206. Ports SP, S, P and IS are formed in body 202. In the first position, channel 216 formed in the first end of sealing lever 206, couples together ports S, P and IS. FIG. 2b is a top view of control valve 200 at a second position in an example embodiment of the invention. In the second position, channel 216 couples together ports SP, S, and P. FIG. 2c is a top view of control valve 200 at a third position in an example embodiment of the invention. In the third position, channel 216 couples together ports SP and S. In one example embodiment of the invention, detents may be used to hold the control valve in the three different positions. In another example embodiment of the invention, the control valve may only have two positions.

Figure 3:
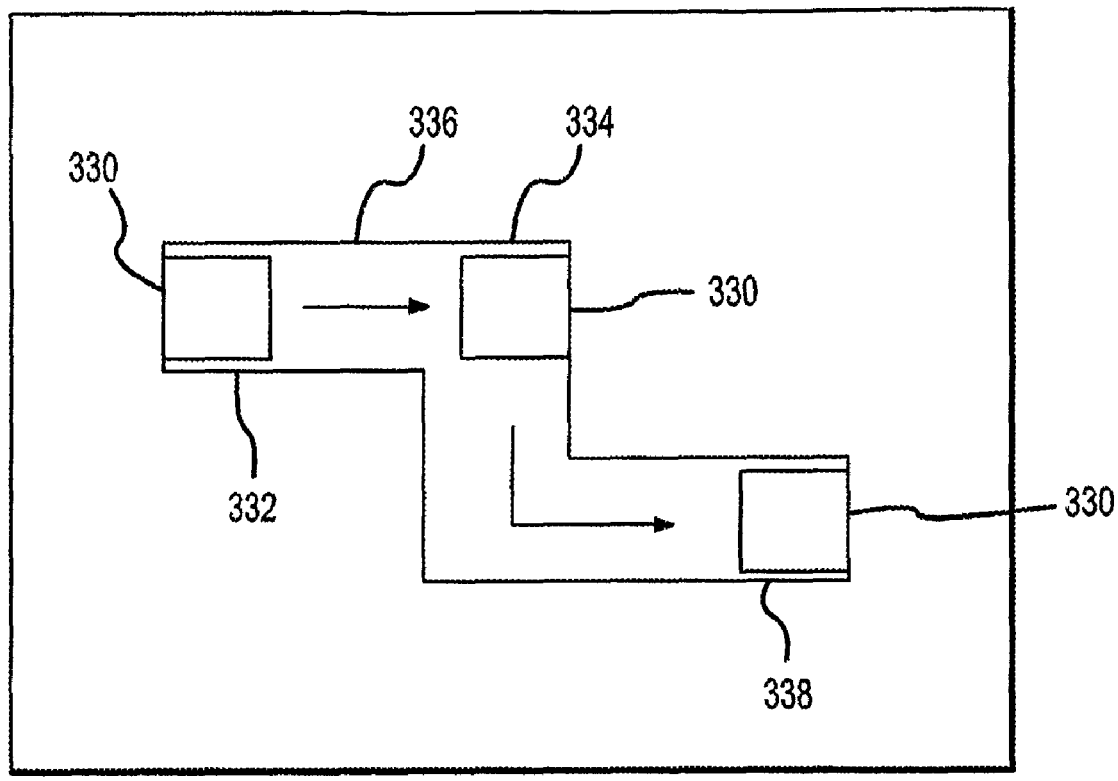
FIG. 3 is a diagram showing the movement path of the shifting lever in an example embodiment of the invention.

In one example embodiment of the invention, the control valve may be used to shift between the different transmission ranges of a heavy duty vehicle. Many heavy duty vehicles have three different transmission ranges, for example a high range, a low range and a deep reduction range. Shifting from the high range directly into the deep reduction range may be unsafe or damage the vehicle. FIG. 3 is a diagram showing the movement path of the shifting lever in an example embodiment of the invention. The movement path occurs in channel 336. Shifting lever 330 is shown at three different positions. Position one is at location 332, position two is at location 334 and position three is at location 338. Moving the shifting lever from position one to position two can be done using a single motion. Moving the shifting lever from position two to position three requires a two step motion; the shifting lever must first be moved downward, and then the shifting lever may be moved to the right. The movement path for the shifting lever shown in figure three is a safety feature that helps prevent shifting the valve from the first position directly to the third position. In one example embodiment of the invention, a spring may be used to bias the shifting lever upward (or downward).

We claim:

1. A valve, comprising:

a body (102) having a plurality of ports formed in the body (102);

a shifting lever (104) coupled to the body (104) and configured to rotate about a first axis with a first range of angular motion, the shifting lever (102) having a first end;

a sealing lever (106) coupled to the body (102) and configured to rotate about a second axis with a second range of angular motion where the second range of angular motion is larger than the first range of angular motion, the sealing lever (106) having a first end and a second end where the first end of the sealing lever (106) is coupled to the first end of the shifting lever (104), the sealing lever (106) having a channel (116) formed in the second end of the sealing lever (106) where the channel (116) is configured to couple together a subset of the plurality of ports (SP, S, P, IS).

2. The valve of claim 1 where the sealing lever (106) is configured to have a first, a second and a third operating position and where the channel (116) couples together a different subset of the plurality of ports at each of the three operating positions.

3. The valve of claim 2 where a detent is configured to hold the shifting lever (104) at each of three locations that correspond to the three operating positions of the sealing lever (106).

4. The valve of claim 2 where the plurality of ports comprise ports SP, S, P and IS and the subset of ports for the first operating position contain ports S, P and IS, the subset of ports for the second operating position contain ports SP, S, and P, and the subset of ports for the third operating position contain ports SP and S.

5. The valve of claim 1 further comprising:
an oval opening (114) formed in the first end of the sealing lever (106) and a cylindrical boss (112) formed on the first end of the shifting lever (104) where the first end of the sealing lever (106) is coupled to the first end of the shifting lever (104) by having the cylindrical boss (112) located inside the oval opening (114).

6. The valve of claim 1 where first axis is parallel with the second axis.

7. A method of manufacturing a control valve, comprising:
forming a body (102) with a plurality of ports;
installing a shifting lever (104) into the body (102) configured to rotate about a first axis with a first range of angular motion, the shifting lever (104) having a first end;
installing a sealing lever (106) into the body (102) configured to rotate about a second axis with a second range of angular motion where the second range of angular motion is larger than the first range of angular motion, the sealing lever (106) having a first end and a second end where the first end of the sealing lever (106) is coupled to the first end of the shifting lever (104), the sealing lever (106) having a channel (116) formed in the second end of the sealing lever (106) where the channel (116) is configured to couple together a subset of the plurality of ports.

8. The method of manufacturing a control valve of claim 7 where the sealing lever (106) is configured to have a first, a second and a third operating position and where the channel (116) couples together a different subset of the plurality of ports at each of the three operating positions.

9. The method of manufacturing a control valve of claim 7 where a detent is configured to hold the shifting lever (104) at each of three locations that correspond to the three operating positions of the sealing lever.

10. The method of manufacturing a control valve of claim 7 where the plurality of ports comprise ports SP, S, P and IS and the subset of ports for the first operating position contain ports S, P and IS, the subset of ports for the second operating position contain ports SP, S, and P, and the subset of ports for the third operating position contain ports SP and S.

11. The method of manufacturing a control valve of claim 7 further comprising:
forming an oval opening (114) in the first end of the sealing lever (106) and forming a cylindrical boss (112) on the first end of the shifting lever (104) where the first end of the sealing lever (106) is coupled to the first end of the shifting lever (104) by having the cylindrical boss (112) located in the oval opening (114).

12. The method of manufacturing a control valve of claim 7 where first axis is parallel with the second axis.

* * * * *